United States Patent
Kim et al.

(10) Patent No.: US 10,067,908 B2
(45) Date of Patent: Sep. 4, 2018

(54) APPARATUS AND METHOD FOR CALCULATING RECEPTION TIME OF WIRELESS COMMUNICATION SIGNAL

(71) Applicant: ELECTRONICS AND TELECOMMUNICATIONS RESEARCH INSTITUTE, Daejeon (KR)

(72) Inventors: Chung Sup Kim, Daejeon (KR); Kanghee Kim, Daejeon (KR); Sang-Won Kim, Daejeon (KR); Ki Cheol Tae, Daejeon (KR); Heung Yong Kang, Daejeon (KR); Yong-Seok Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/595,094

(22) Filed: May 15, 2017

(65) Prior Publication Data
US 2017/0329743 A1    Nov. 16, 2017

(30) Foreign Application Priority Data

May 16, 2016    (KR) .......................... 10-2016-0059560

(51) Int. Cl.
*G06F 17/14*    (2006.01)
*H04L 27/26*    (2006.01)

(52) U.S. Cl.
CPC .......... *G06F 17/141* (2013.01); *H04L 27/265* (2013.01)

(58) Field of Classification Search
CPC ............................ G06F 17/141; H04L 27/265
USPC ......................................................... 708/405
See application file for complete search history.

(56) References Cited

U.S. PATENT DOCUMENTS

| 6,018,312 | A | * | 1/2000 | Haworth | G01S 1/026 342/353 |
| 8,175,134 | B1 | * | 5/2012 | Giallorenzi | H04B 1/692 375/132 |
| 2005/0143916 | A1 | | 6/2005 | Kim et al. | |
| 2009/0058729 | A1 | | 3/2009 | Jo | |

(Continued)

FOREIGN PATENT DOCUMENTS

KR    10-2007-0048281 A    5/2007

*Primary Examiner* — Tan V. Mai
(74) *Attorney, Agent, or Firm* — NSIP Law

(57) ABSTRACT

An apparatus for calculating a reception time of a wireless communication signal is disclosed. The apparatus includes a downconverted signal generator configured to generate a downconverted signal, a baseband signal, by downconverting a frequency of a signal received from a transmission source, a modulated signal generator configured to generate a modulated signal by multiplying the downconverted signal by a randomly generated reference signal, a time difference calculator configured to calculate a time difference between the modulated signal and the reference signal by cross-correlating the modulated signal and the reference signal, and a reception time calculator configured to calculate a reception time of the signal received from the transmission source using a point in time at which the reference signal is generated and the time difference between the modulated signal and the reference signal.

10 Claims, 8 Drawing Sheets

(56) References Cited

U.S. PATENT DOCUMENTS

2009/0149198 A1 6/2009 Nam et al.
2009/0310505 A1 12/2009 Tsai et al.

* cited by examiner

Modulated signal

Reference signal

APPARATUS AND METHOD FOR CALCULATING RECEPTION TIME OF WIRELESS COMMUNICATION SIGNAL

CROSS-REFERENCE TO RELATED APPLICATION(S)

This application claims the benefit under 35 USC § 119(a) of Korean Patent Application No. 10-2016-0059560 filed on May 16, 2016, in the Korean Intellectual Property Office, the entire disclosure of which is incorporated herein by reference for all purposes.

BACKGROUND

1. Field

The following description relates to an apparatus and method for calculating a location of a transmission source, and more particularly, to an apparatus and method for calculating an accurate point in time at which a reception source receives a signal and thereby estimating an accurate location of a transmission source.

2. Description of Related Art

In line with the development of mobile communication technology, a method of estimating an accurate location of an object has also been developed in the field of a communication network. In a general communication system for wireless communication, a location of a transmission source, which is a target for location estimation, is estimated using an antenna array, or an array antenna. However, such a method using an array antenna to estimate a location of a transmission source may cost high due to equipment. Thus, as an alternative of such a location estimation method using an array antenna, a method using a time difference among signal sources measured by at least three sensors for which time synchronization is enabled may be used. To estimate a location of a transmission source using a time difference between signal sources, a time difference between signals arriving at respective sensors may need to be accurately calculated. To this end, an analog-to-digital converter (ADC) may need to have a high sampling rate to improve a time resolution. However, using such an ADC having a high sampling rate may increase a hardware cost.

SUMMARY

This Summary is provided to introduce a selection of concepts in a simplified form that are further described below in the Detailed Description. This Summary is not intended to identify key features or essential features of the claimed subject matter, nor is this Summary intended to be used as an aid in determining the scope of the claimed subject matter.

In one general aspect, an apparatus for calculating a reception time of a wireless communication signal, the apparatus includes a downconverted signal generator configured to generate a downconverted signal, a baseband signal, by downconverting a frequency of a signal received from a transmission source, a modulated signal generator configured to generate a modulated signal by multiplying the downconverted signal by a randomly generated reference signal, a time difference calculator configured to calculate a time difference between the modulated signal and the reference signal by cross-correlating the modulated signal and the reference signal, and a reception time calculator configured to calculate a reception time of the signal received from the transmission source using a point in time at which the reference signal is generated and the time difference between the modulated signal and the reference signal.

The downconverted signal generator may determine a modulation index based on a modulation method for the signal received from the transmission source using an autocorrelation function of the signal received from the transmission source.

The downconverted signal generator may generate the downconverted signal by removing a frequency offset of the received signal estimated through the modulation index based on the modulation method for the received signal.

The modulated signal generator may generate the modulated signal by multiplying the downconverted signal by the randomly generated reference signal, which is a chirp signal.

The apparatus further includes a time difference re-calculator configured to re-calculate the time difference between the modulated signal and the reference signal by increasing a sampling rate by interpolating a sample in a period prior to and subsequent to the calculated reception time, and by performing a discrete Fourier transform (DFT) on the modulated signal and the reference signal.

Other features and aspects will be apparent from the following detailed description, the drawings, and the claims.

Figure 1:
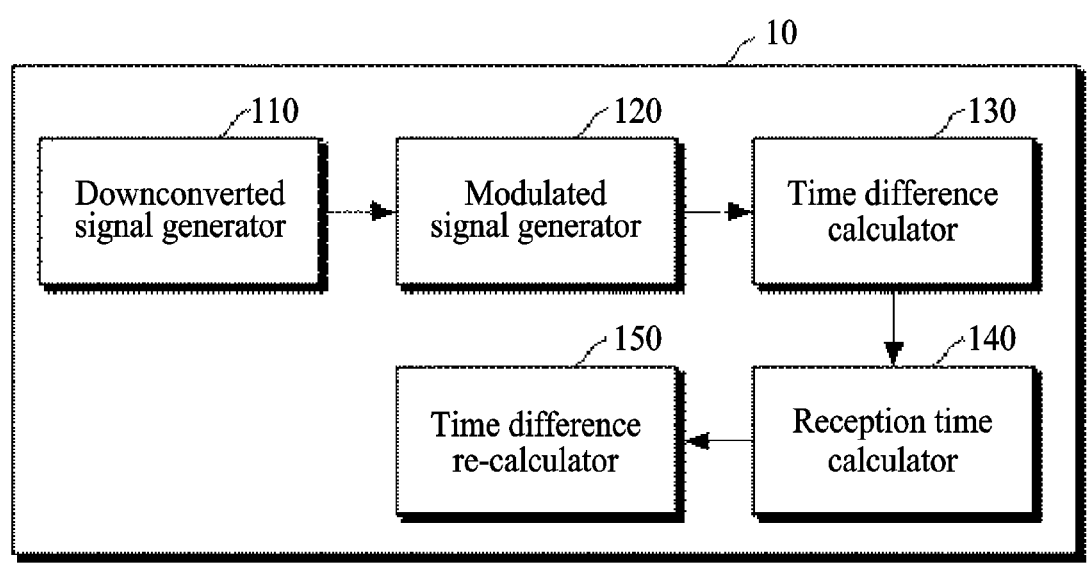
FIG. 1 is a diagram illustrating an example of an apparatus for calculating a reception time of a wireless communication signal.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, such non-limiting example embodiments will be described in greater detail with reference to the accompanying drawings. Like reference numerals in the drawings denote like elements.

FIG. 1 is a diagram illustrating an example of an apparatus for calculating a reception time of a wireless communication signal.

Referring to FIG. 1, an apparatus 10 for calculating a reception time of a wireless communication signal (hereinafter simply referred to as the apparatus 10) includes a downconverted signal generator 110, a modulated signal generator 120, a time difference calculator 130, and a reception time calculator 140.

The downconverted signal generator 110 generates a downconverted signal, which is a baseband signal, by downconverting a frequency of a signal received from a transmission source. The transmission source modulates an original signal, and transmits a high-frequency signal to the apparatus 10. The downconverted signal generator 110 downconverts the high-frequency signal received from the transmission source to a low-frequency signal.

The baseband signal refers to an original information signal that is not modulated, and only includes a direct current (DC) component with a frequency of 0. The downconverted signal generator 110 generates a DC component signal by downconverting a frequency of the high-frequency signal received from the transmission source.

The modulated signal generator 120 generates a modulated signal by multiplying the downconverted signal by a randomly generated reference signal. As described above, the downconverted signal generator 110 generates the downconverted signal, which is the baseband signal. The apparatus 10 continuously generates a reference signal before receiving the signal from the transmission source. The modulated signal generator 120 generates the modulated signal by multiplying the downconverted signal, which is the baseband signal, by the randomly generated reference signal. The modulated signal is delayed in time by a point in time at which the downconverted signal is generated from a point in time at which the reference signal is generated. A reference signal, which is amplified by a magnitude of the downconverted signal based on a magnitude of the reference signal, is generated.

The time difference calculator 130 calculates a time difference between the modulated signal and the reference signal by cross-correlating the modulated signal and the reference signal. The time difference calculator 130 detects a peak value of a signal to be output by cross-correlating the modulated signal and the reference signal. The time difference calculator 130 also detects a peak value of a signal to be output by auto-correlating the reference signal. The time difference calculator 130 calculates the time difference between the modulated signal and the reference signal based on a difference between a location at which the peak value of the signal output by cross-correlating the modulated signal and the reference signal is detected and a location at which the peak value of the signal output by auto-correlating the reference signal is detected. The time difference calculator 130 calculates the time difference between the modulated signal and the reference signal by converting, to a time difference, a difference between a number of samples from which the peak value of the signal output through the cross-correlation is detected and a number of samples from which the peak value of the signal output through the auto-correlation is detected.

The reception time calculator 140 calculates a reception time of the signal received from the transmission source using the point in time at which the reference signal is generated and the time difference between the modulated signal and the reference signal. The reference signal is a signal generated autonomously by the apparatus 10, and thus the reception time calculator 140 calculates an absolute time of the point in time at which the reference time is generated. The reception time calculator 140 calculates the reception time of the signal received from the transmission source based on the time difference between the modulated signal and the reference signal calculated by the time difference calculator 130, and the absolute time of the point in time at which the reference time is generated.

In one example, the downconverted signal generator 110 determines a modulation index based on a modulation method for the signal received from the transmission source using an auto-correlation function of the signal received from the transmission source.

$$LR_{slope_M} = |ACF(input^{2^M})|$$

$$M_{decision} = \min_M[LR_{slope_M} \geq LR_{slope_1}] \quad \text{[Equation 1]}$$

The downconverted signal generator 110 assumes a modulation index M as represented by Equation 1 above and obtains a slope of an auto-correlation function with respect to M, and determines an actual modulation index M by comparing the obtained slope and a slope of an auto-correlation function in a case of M being 0 (M=0). In a case that a result of the auto-correlation function to the power of M based on a value of M as represented by Equation 1 above corresponds to the actual modulation index M, power of a type modulated by the modulation index may disappear and only power of a transmission frequency increased by a factor of M and noise power may be remained. Here, when obtaining an absolute value of the slope, a unique linear component may be generated.

Such a linear component may be generated when the modulated type power disappears, and thus by squaring M with a value greater than or equal to the actual modulation index M, the linear component of which a slope rapidly increases may be generated. Here, in response to the slope of the linear component being greater than a representative slope in a case of M being 0 (M=0) as a result of comparing the slope of the linear component and the representative slop, it may be determined that the linear component is generated. A minimum value of M among values of M satisfying a requirement for the generation of the linear component may be selected as the actual modulation index M of an input signal.

Equation 1 above is used to obtain a result of an auto-correlation function with respect to a population M, which is selected from a range of integers greater than 0. A minimum modulation index M among modulation index values allowing the slope to be greater than the representative slope may be selected to be the modulation index based on the modulation method for the received signal.

The actual modulation index may be determined by comparing a result of the M-squared auto-correlation function and a slope value of a magnitude of input data with M being 0 (M=0), without using a frequency conversion method, and thus an amount of calculation may be relatively small. When using a method of comparing a detection envelope for determining the modulation index and the slope of the auto-correlation function of a signal with M being 0 (M=0), such a method may be applied irrespective of a type of the signal and a number of samples. Here, by estimating a power spectrum of the M squaring using an actually obtained value of M, a transmission frequency of an input signal may also be estimated.

In one example, the downconverted signal generator 110 generates the downconverted signal by removing a frequency offset of the received signal that is estimated through the modulation index based on the modulation method for the received signal.

When the modulation index M based on the modulation method for the received signal is determined and squaring M to the received signal, a modulation component of the received signal may be removed. When the modulation component is removed, only a sinusoidal component, which is a carrier wave, and noise from the M squaring may be present, and thus calculating the frequency offset may be enabled. Here, the frequency offset may be a frequency of a sinusoidal wave, which is a carrier wave.

In one example, the modulated signal generator 120 generates the modulated signal by multiplying the downconverted signal by the randomly generated reference signal, which is a chirp signal. The chirp signal refers to a signal of which a frequency increases linearly based on time. The apparatus 10 continuously generates the reference signal, which is the chirp signal, before the signal is received from the transmission source.

The modulated signal generator 120 generates the modulated signal by multiplying the downconverted signal, which is the baseband signal, by the reference signal, which is the chirp signal. The modulated signal may be delayed in time by a point in time at which the downconverted signal is generated, from a point in time at which the reference signal, which is the chirp signal, is generated. A reference signal, which is amplified by a magnitude of the downconverted signal based on a magnitude of the reference signal, which is the chirp signal, may be generated.

Referring to FIG. 1, the apparatus 10 further includes a time difference re-calculator 150 configured to re-calculate the time difference between the modulated signal and the reference signal by increasing a sampling rate by interpolating a sample only in a period prior to and subsequent to the calculated reception time, and by performing a discrete Fourier transform (DFT) on the modulated signal and the reference signal. In a case that a sampling rate of an analog-to-digital converter (ADC) included in the apparatus 10 is low, an error range of the time difference calculated by the time difference calculator 130 may increase. In such a case, a considerable amount of time may be consumed to calculate the time difference by increasing the sampling rate of the ADC for all periods.

The time difference re-calculator 150 re-calculates the time difference between the modulated signal and the reference signal by interpolating a sample only in the period prior to and subsequent to the reception time and increasing the sampling rate, and thus the time difference may be more accurately and rapidly calculated. Here, the interpolating of a sample indicates adding at least one new sample to samples at an original sampling rate and increasing the sampling rate. By interpolating a sample only during a certain time before and after an estimated point in time at which an input signal is received, instead of interpolating a sample from a point in time at which an initial reference signal is generated, the amount of time consumed to calculate the time difference may be reduced.

A method of re-calculating the time difference by the time difference re-calculator 150 may be represented by Equation 2 below.

$$T_{last} = \frac{[DFT(\text{modulated signal}) - DFT(\text{reference signal})] * T}{2 * B} \quad \text{[Equation 2]}$$

In Equation 2, $T_{last}$ denotes a time difference between a modulated signal and a reference signal. DFT is performed on each of the modulated signal and the reference signal to obtain a difference between respective results of the DFT. When the DFT is performed on the reference signal, a frequency may increase gradually starting from 0. When the DFT is performed on the modulated signal, a frequency may increase gradually starting from a frequency, for example, f1. Since the modulated signal is generated when a certain amount of time is delayed after the reference signal is generated, the result of performing the DFT on the modulated signal may thus start from the frequency f1 corresponding to the delayed time.

By dividing the difference between the results of performing the DFT on the modulated signal and the reference signal by 2, a frequency difference between the two results of the DFT may be obtained. By multiplying the obtained frequency difference by a time T at which the reference signal, or a chirp signal, is generated, and dividing a resulting value by a frequency at the time T at which the reference signal is generated, the time difference between the modulated signal and the reference signal may be obtained. The time difference may be equal to a time difference between the input signal and the reference signal.

The reception time calculator 140 calculates the reception time of the signal received from the transmission source using the time difference re-calculated by the time difference re-calculator 150.

Figure 2:
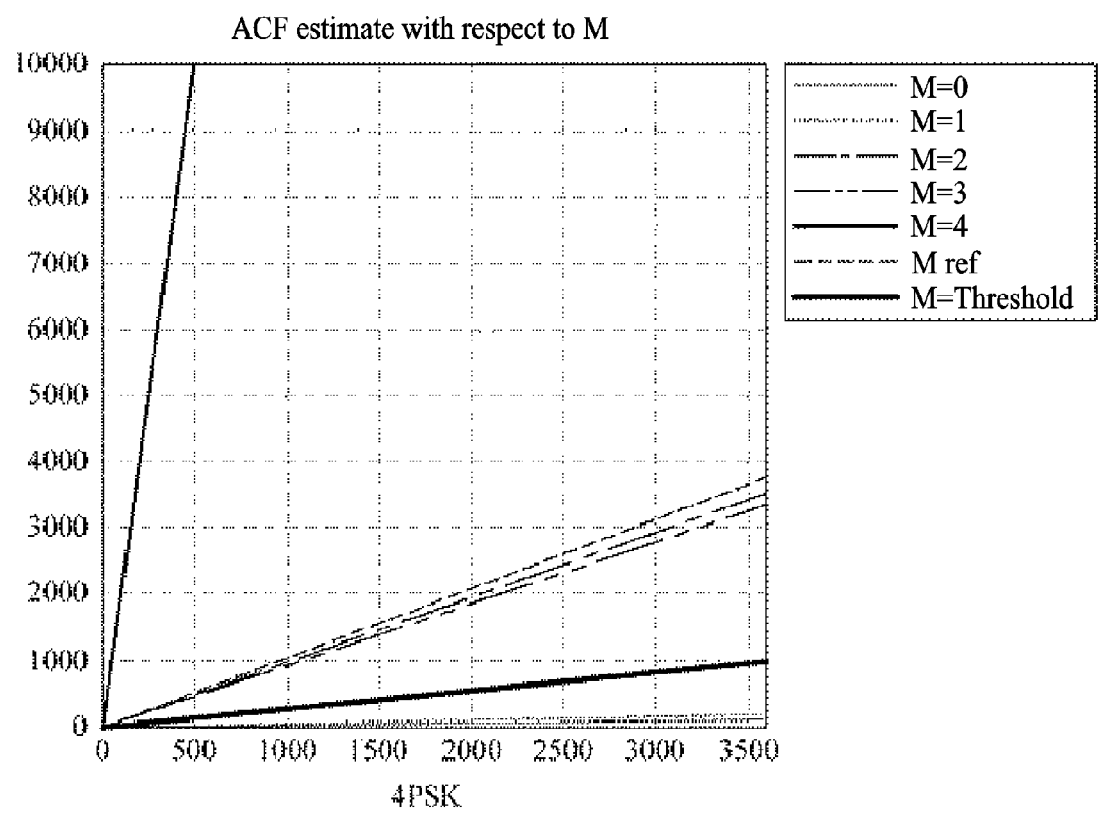
FIG. 2 is a graph illustrating an example of a result of performing an algorithm for determining a modulation index for a 4 phase-shift keying (PSK) signal.

FIG. 2 is a graph illustrating an example of a result of performing an algorithm for determining a modulation index with respect to a 4 phase-shift keying (PSK) signal.

Referring to the graph of FIG. 2, a slope of an auto-correlation function with a value of M being greater than or equal to 2 (M=2) is greater than a threshold envelope, and thus a minimum value of a modulation index M that satisfies a requirement is determined to be 2. As represented by Equation 1 above, a result of M-squaring 2 is 4, and thus an input signal may be estimated as a 4 PSK signal.

Figure 3:
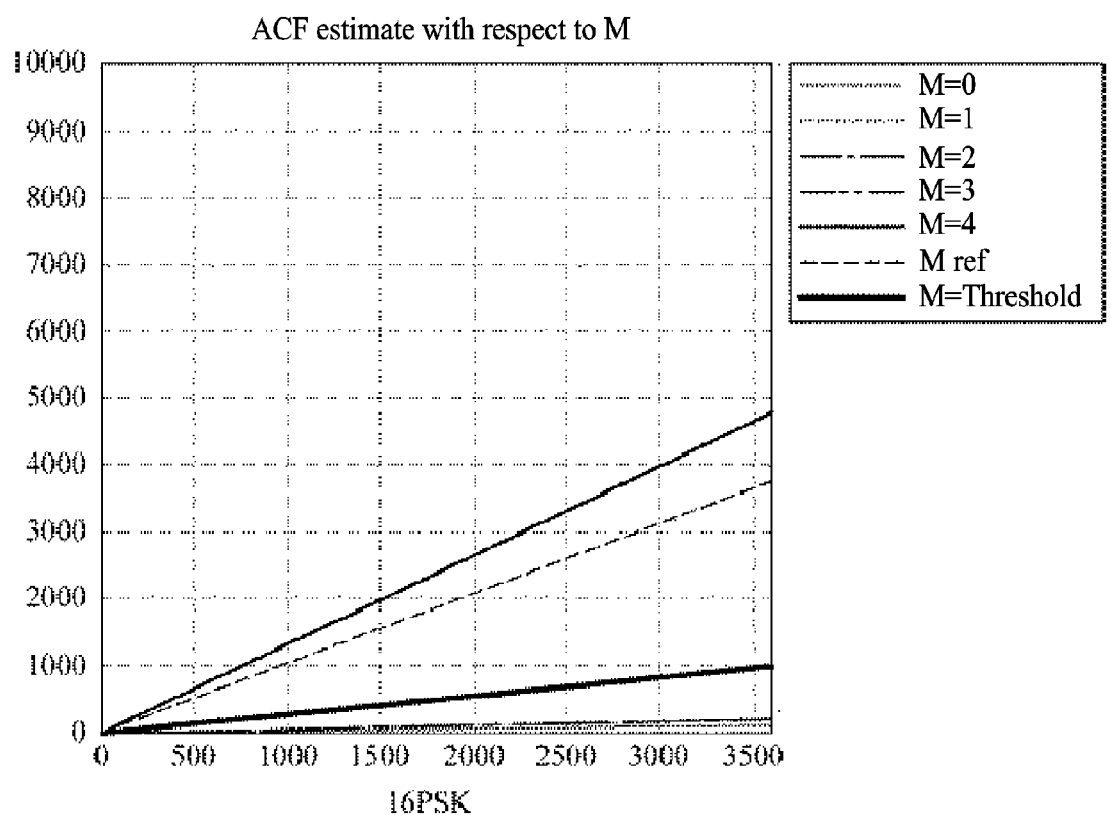
FIG. 3 is a graph illustrating an example of a result of performing an algorithm for determining a modulation index for a 16 PSK signal.

FIG. 3 is a graph illustrating an example of a result of performing an algorithm for determining a modulation index with respect to a 16 PSK signal.

Referring to the graph of FIG. 3, a slope of an auto-correlation function with a value of M being greater than or equal to 4 (M=4) is greater than a threshold envelope, and thus a minimum value of a modulation index M that satisfies a requirement is determined to be 4. As represented by Equation 1 above, a result of M-squaring 2 is 16, and thus an input signal may be estimated as a 16 PSK signal.

Figure 4:
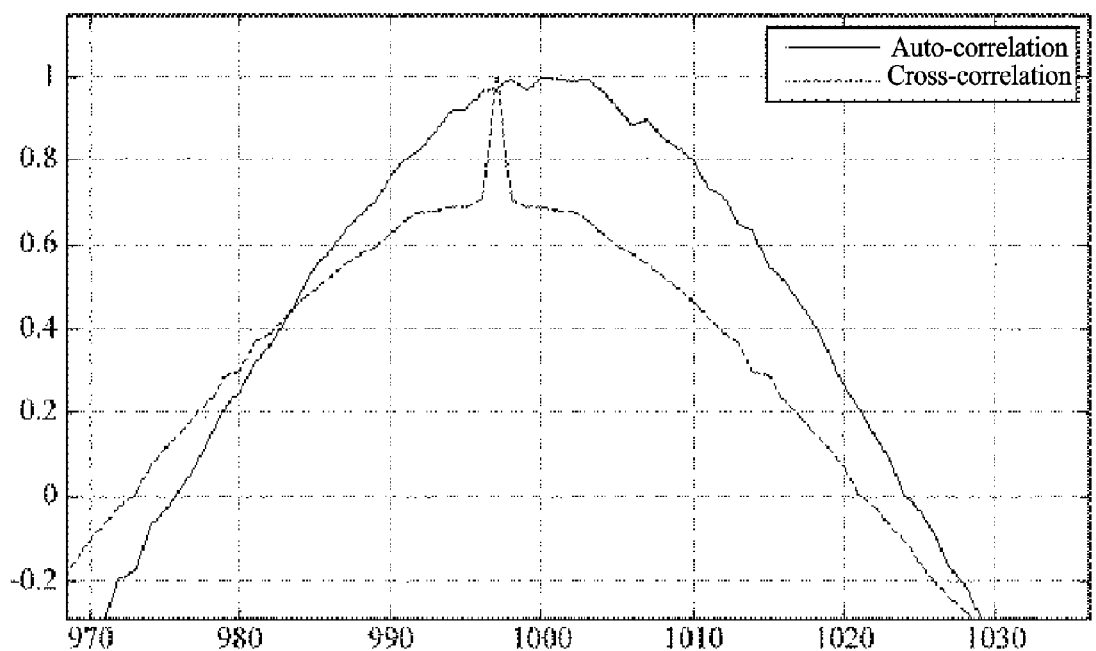
FIG. 4 is a graph illustrating an example of a waveform obtained by cross-correlating a modulated signal and a reference signal and an example of a waveform obtained by auto-correlating the reference signal, in a case of the reference signal being a sinusoidal signal.

FIG. 4 is a graph illustrating an example of a waveform obtained by cross-correlating a modulated signal and a reference signal and an example of a waveform obtained by auto-correlating the reference signal, in a case of the reference signal being a sinusoidal signal. Referring to the graph of FIG. 4, a waveform is obtained under a condition in which a sampling rate is 100 megahertz (Mhz), an offset frequency that is a frequency of a reference signal is 4 kilohertz (Khz), and a signal-to-noise ratio (SNR) is 10 decibels (dB).

The time difference calculator 130 of FIG. 1 detects a peak value of a signal to be output by cross-correlating a modulated signal and a reference signal. The time difference calculator 130 also detects a peak value of a signal to be output by auto-correlating the reference signal. The time difference calculator 130 calculates a time difference between the modulated signal and the reference signal based on a difference between a location at which the peak value of the signal output by cross-correlating the modulated signal and the reference signal is detected and a location at which the peak value of the signal output by auto-correlating the reference signal is detected.

As illustrated in FIG. 4, the location at which the peak value of the signal output by auto-correlating the reference signal is detected is between a point 990 and a point 1000 in an x coordinate, which indicates that the reference signal auto-correlated between a 990th sample and a 1000th sample has the peak value. The location at which the peak value of the signal output by cross-correlating the modulated signal and the reference signal is detected is between a point 990 and a point 1010 in the x coordinate, which indicates that the signal output by cross-correlating the modulated signal and the reference signal between a 990th sample and a 1010th sample has the peak value. The time difference calculator 130 calculates the time difference between the modulated signal and the reference signal by converting, to a time difference, a difference between a number of samples from which the peak value of the signal output through the auto-correlation is detected and a number of samples from which the peak value of the signal output through the cross-correlation is detected.

However, in the example of FIG. 4, the respective peak values of the auto-correlated signal and the cross-correlated signal may not be accurate, and thus the time difference may not be accurately calculated. In the example of FIG. 4, the reference signal is a sinusoidal signal, in lieu of a chirp signal, and the input signal may be a low-frequency signal obtained through frequency downconversion. The input signal may not be a complete DC signal.

Figure 5:
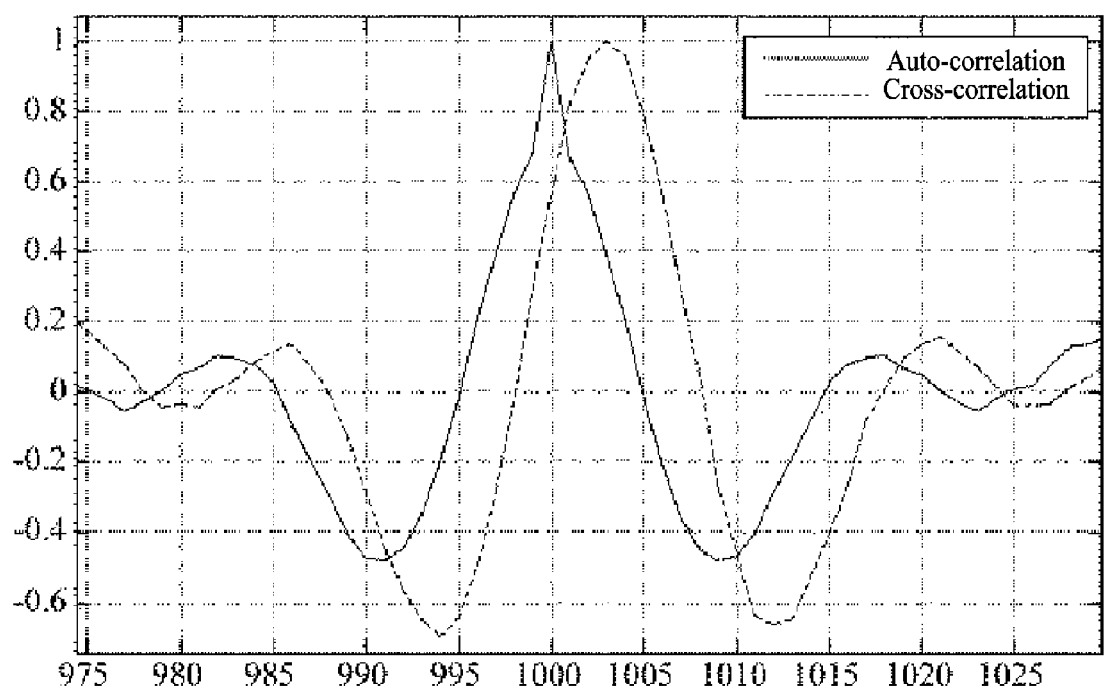
FIG. 5 is a graph illustrating an example of a waveform obtained by cross-correlating a modulated signal and a reference signal and an example of a waveform obtained by auto-correlating the reference signal, in a case of the reference signal being a chirp signal.

FIG. 5 is a graph illustrating an example of a waveform obtained by cross-correlating a modulated signal and a reference signal and an example of a waveform obtained by auto-correlating the reference signal, in a case of the reference signal being a chirp signal. Referring to the graph of FIG. 5, a waveform is obtained under a condition in which a sampling rate is 100 Mhz, an offset frequency that is a frequency of a reference signal is 4 Khz, and an SNR is 10 dB.

The time difference calculator 130 of FIG. 1 detects a peak value of a signal to be output by cross-correlating a modulated signal and a reference signal. The time difference calculator 130 also detects a peak value of a signal to be output by auto-correlating the reference signal. The time difference calculator 130 calculates a time difference between the modulated signal and the reference signal based on a difference between a location at which the peak value of the signal output by cross-correlating the modulated signal and the reference signal is detected and a location at which the peak value of the signal output by auto-correlating the reference signal is detected.

As illustrated in FIG. 5, the location at which the peak value of the signal output by auto-correlating the reference signal is detected is at a point 1000 in an x coordinate, which indicates that the reference signal auto-correlated at a 1000th sample has the peak value. The location at which the peak value of the signal output by cross-correlating the modulated signal and the reference signal is detected is between a point 1000 and a point 1005 in the x coordinate, which indicates that the signal output by cross-correlating the modulated signal and the reference signal between a 1000th sample and a 1005th sample has the peak value. The time difference calculator 130 calculates the time difference between the modulated signal and the reference signal by converting, to a time difference, a difference between a number of samples from which the peak value of the signal output through the auto-correlation is detected and a number of samples from which the peak value of the signal output through the cross-correlation is detected.

In the example of FIG. 5, by comparing the graphs illustrated in FIGS. 4 and 5, the respective peak values of the auto-correlated signal and the cross-correlated signal may be accurate, and thus the time difference may be accurately calculated. In the example of FIG. 5, the reference signal is a chirp signal, and an input signal is a complete DC signal through frequency downconversion.

Figure 6:
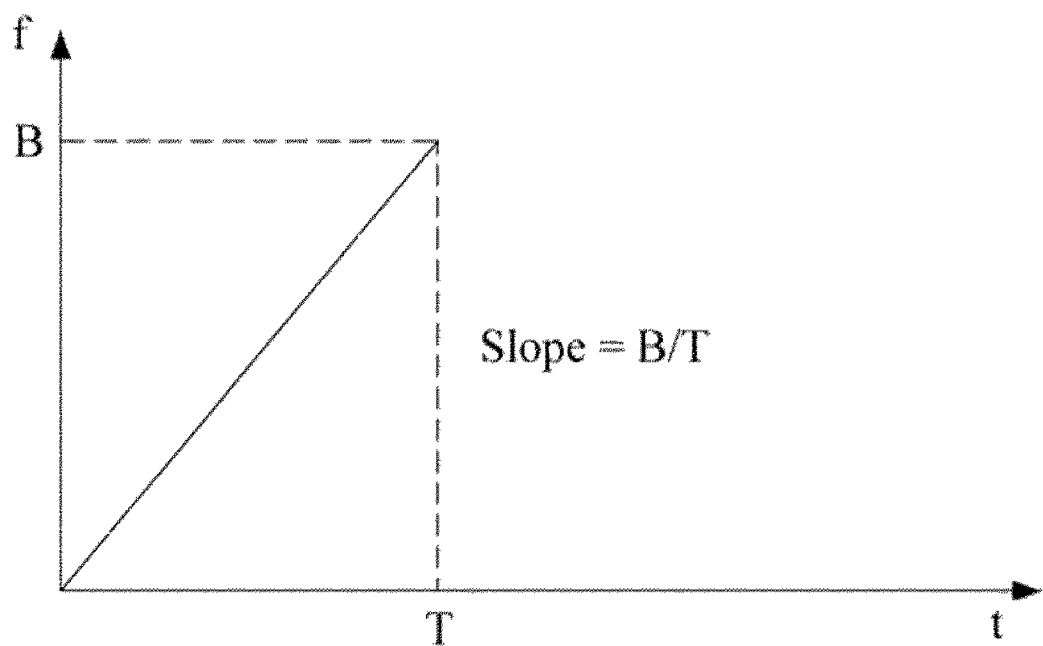
FIG. 6 is a graph illustrating an example of a waveform of a chirp signal.

FIG. 6 is a graph illustrating an example of a waveform of a chirp signal.

Referring to FIG. 6, a chirp signal refers to a signal of which a frequency increases linearly over time. As illustrated in the graph of FIG. 6, the chirp signal has a slope of B/T, in which T denotes a time at which the chirp signal is generated and B denotes a frequency at the time T.

Figure 7A:
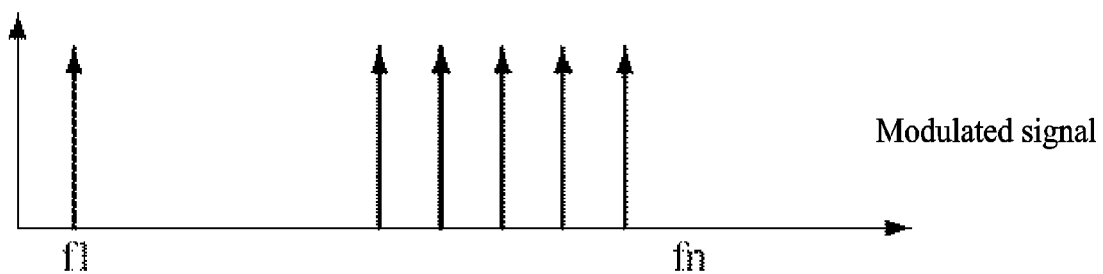
FIGS. 7A and 7B are graphs illustrating examples of waveforms obtained by performing a discrete Fourier transform (DFT) on a modulated signal and a reference signal, respectively.
Figure 7B:
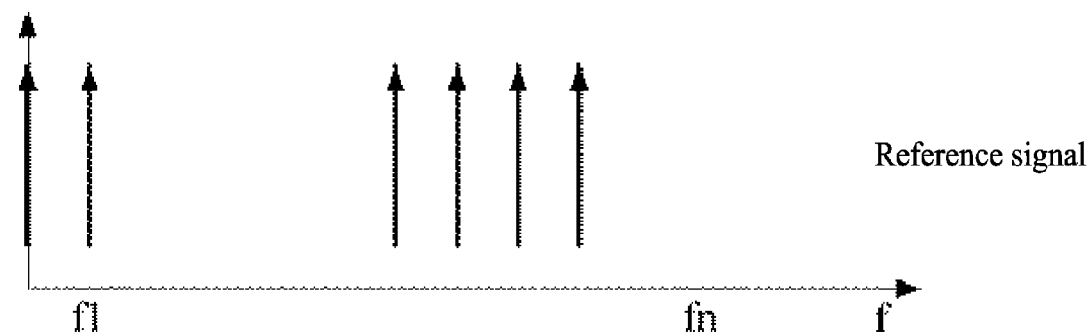

FIGS. 7A and 7B are graphs illustrating examples of waveforms obtained by performing a DFT on a modulated signal and a reference signal, respectively. Referring to FIG. 7B, a reference signal is a chirp signal, and thus a frequency increases from 0 (DC) to fn−2. Referring to FIG. 7A, a modulated signal is delayed relative to the reference signal to start a chirp form, and thus a frequency increases from f1, not a 0 (DC), to fn−1.

Figure 8:
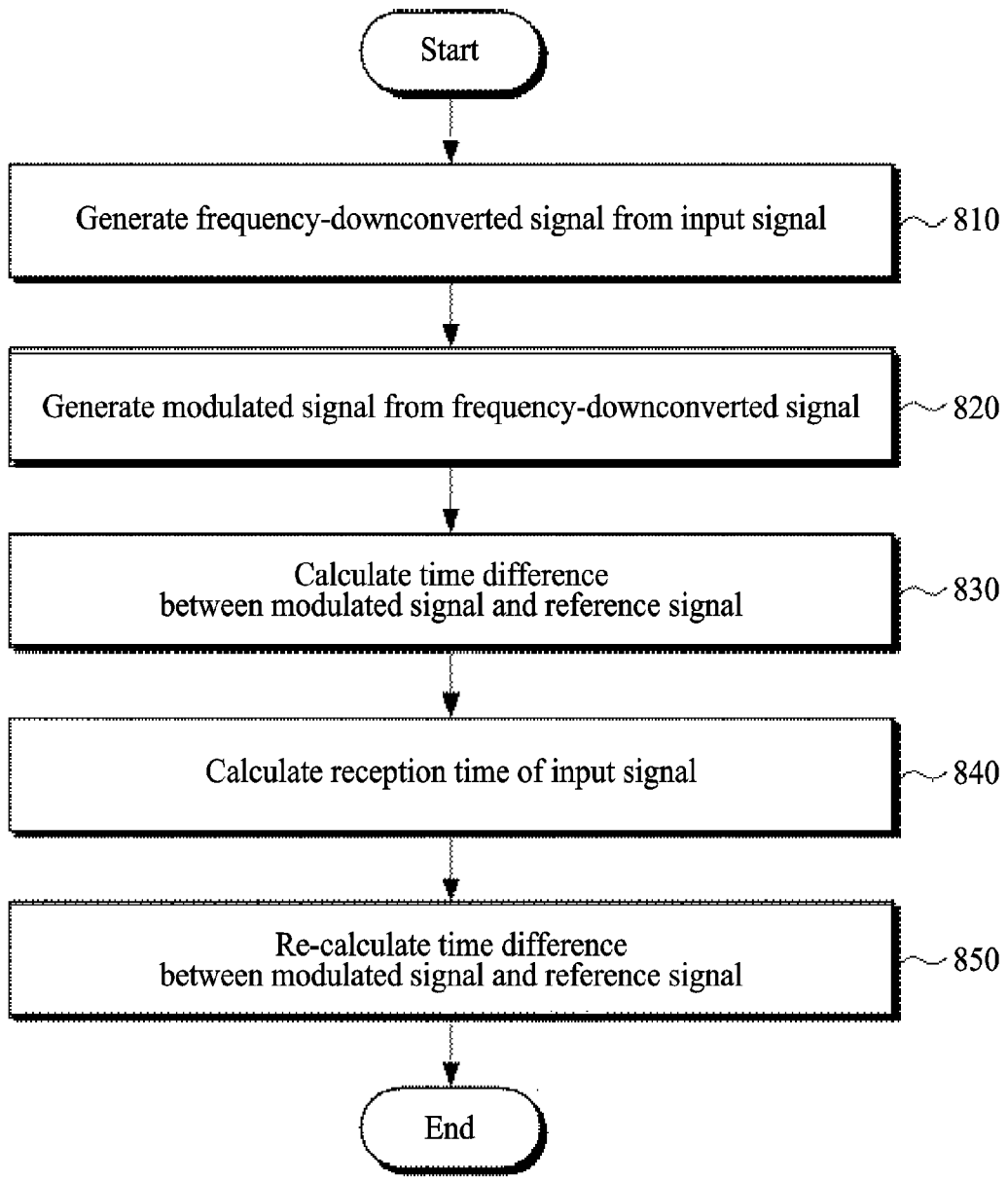
FIG. 8 is a flowchart illustrating an example of a method of calculating a reception time of a wireless communication signal.

FIG. 8 is a flowchart illustrating an example of a method of calculating a reception time of a wireless communication signal.

A method of calculating a reception time of a wireless communication signal, or a time at which the wireless communication signal is received, (hereinafter simply referred to as the method) to be described hereinafter may include operation 810 of generating a downconverted signal, operation 820 of generating a modulated signal, operation 830 of calculating a time difference, and operation 840 of calculating a reception time.

Referring to FIG. 8, in operation 810, a downconverted signal, which is a baseband signal, is generated by downconverting a frequency of a signal received from a transmission source. The transmission source transmits a high-frequency signal generated by modulating an original signal. In operation 810, the high-frequency signal received from the transmission source is downconverted to a low-frequency signal.

The baseband signal refers to an original information signal that is not modulated, and only includes a DC component with a frequency of 0. In operation 810, a DC component signal is generated by downconverting a frequency of the high-frequency signal received from the transmission source.

In operation 820, a modulated signal is generated by multiplying the downconverted signal by a randomly generated reference signal. As described above, in operation 810, the downconverted signal, the baseband signal, is generated. In the method, a reference signal is continuously generated before the signal is received from the transmission source. In operation 820, the modulated signal is generated by multiplying the downconverted signal, which is the baseband signal, by the randomly generated reference signal. The modulated signal may be delayed in time by a point in time at which the downconverted signal is generated from a point in time at which the reference signal is generated, and a reference signal amplified by a magnitude of the downconverted signal based on a magnitude of the reference signal may be generated.

In operation 830, a time difference between the modulated signal and the reference signal is calculated by cross-correlating the modulated signal and the reference signal. In operation 830, a peak value of a signal to be output by cross-correlating the modulated signal and the reference signal is detected. In operation 830, a peak value of a signal to be output by auto-correlating the reference signal is also detected. In operation 830, the time difference between the modulated signal and the reference signal is calculated based on a difference between a location at which the peak value of the signal output by cross-correlating the modulated signal and the reference signal is detected and a location at which the peak value of the signal output by auto-correlating the reference signal is detected. In operation 830, the time difference between the modulated signal and the reference signal is calculated by converting, to the time difference, a difference between a number of samples from which the peak value of the signal output through the auto-correlation is detected and a number of samples from which the peak value of the signal output through the cross-correlation is detected.

In operation 840, a reception time of the signal received from the transmission source, or a time at which the signal is received from the transmission source, is calculated using a point in time at which the reference sign is generated and the time difference between the modulated signal and the reference signal. The reference signal is autonomously generated through the method, and thus an absolute time of the point in time at which the reference signal is generated may be calculated. In operation 840, the reception time of the signal received from the transmission source is calculated based on the time difference between the modulated signal and the reference signal that is calculated in operation 830 and on the absolute time of the point in time at which the reference signal is generated.

In one example, in operation 810, a modulation index based on a modulation method for the signal received from the transmission source is determined using an auto-correlation function of the signal received from the transmission source.

In operation 810, a value of a modulation index M is assumed as represented by Equation 1 above, a slope of an auto-correlation function with respect to the modulation index M is obtained. An actual modulation index M is then determined by comparing the obtained slope of the auto-correlation function and a slope of the auto-correlation function in a case of the modulation index M being 0 (M=0). As represented in Equation 1 above, when a result of M-squaring the auto-correlation function based on a value of M corresponds to the actual modulation index M, a power of a type modulated by the modulation index M may disappear, and thus only power of a transmission frequency being faster by a factor of M and noise power may be remained, and a unique linear component may be generated when obtaining an absolute value of the slope represented in Equation 1.

Such a linear component may be generated only when the modulated type power disappears, and thus a linear component of which a slope increases rapidly may appear in a case of the M-squaring with a value greater than or equal to the actual modulation index M. When the slope of such a linear component is greater than a representative slope in a case of M being 0 (M=0) as a result of comparing the slope of the linear component and the representative slope in the case of M being 0 (M=0), it may be determined that the linear component is generated. A minimum value of M among values of M satisfying a requirement for the generation of the linear component may be selected to be the actual modulation index M of an input signal.

Equation 1 above is used to obtain a result of an auto-correlation function with respect to a population M, which may be selected from a range of integers greater than or equal to 0. A minimum modulation index M among modulation index values allowing the slope to be greater than the representative slope may be selected to be the modulation index based on the modulation method for the received signal.

The actual modulation index may be determined by comparing a result of the M-squared auto-correlation function and a slope value of a magnitude of input data with M being 0 (M=0), without using a frequency conversion method, for example, a power spectrum, and thus an amount of calculation may be relatively small. When using a method of comparing a detection envelope for determining the modulation index and the slope of the auto-correlation function of a signal with M being 0, such a method may be applied irrespective of a type of the signal and a number of samples. Here, by estimating the power spectrum associated with the M-squaring using the obtained value of the actual modulation index M, a transmission frequency of the input signal may also be estimated.

In one example, in operation 810, the downconverted signal is generated by removing a frequency offset of the received signal that is estimated through the modulation index based on the modulation method for the received signal.

When the modulation index M based on the modulation method for the received signal is determined and the received signal is M-squared, a modulation component of the received signal may be removed. When the modulation component is removed, only a sinusoidal component, which is a carrier wave, and noise from the M-squaring may be present, and thus the frequency offset may be calculated. The frequency offset may be a frequency of a sinusoidal wave, which is the carrier wave.

In one example, in operation 820, the modulated signal is generated by multiplying the downconverted signal by the randomly generated reference signal. Here, the reference signal is a chirp signal. The chirp signal refers to a signal of which a frequency increases linearly over time. In the method, the reference signal, which is the chirp signal, may be continuously generated before the signal is received from the transmission source.

In operation 820, the modulated signal is generated by multiplying the downconverted signal, which is the baseband signal, by the randomly generated reference signal, which is the chirp signal. The reference signal may be delayed in time by the point in time at which the downconverted signal is generated from the point in time at which the reference signal, or the chirp signal, is generated, and a reference signal amplified by a magnitude of the downconverted signal based on a magnitude of the reference signal, which is the chirp signal, may be generated.

In one example, the method further includes operation 850 of re-calculating the time difference between the modulated signal and the reference signal by increasing a sampling rate by interpolating a sample only in a period prior to and subsequent to the calculated reception time, and by performing a DFT on the modulated signal and the reference signal. In a case that a sampling rate of an ADC is low, an error range of the time difference calculated in operation 830 may increase. In such a case, a considerable amount of time may be consumed to calculate the time-difference by increasing the sampling rate of the ADC for all periods.

Through operation 850, the time difference may be more accurately and rapidly calculated by increasing the sampling rate by interpolating a sample only in a period prior to and subsequent to the reception time, and by re-calculating the time difference between the modulated signal and the reference signal. The interpolating of a sample refers to a method of increasing the sampling rate by adding at least one new sample to samples at an original sampling rate. The amount of time to be consumed to calculate the time difference may be reduced by interpolating a sample only during a certain time prior to and subsequent to the estimated point in time at which the input signal is received, instead of interpolating a sample from a point in time at which an initial reference signal is generated.

Operation 850 may be performed based on Equation 2 above.

In Equation 2 above, $T_{last}$ denotes a time difference between a modulated signal and a reference signal. A difference between a result obtained by performing a DFT on the modulated signal and a result obtained by performing a DFT on the reference signal may be obtained. Through the DFT performed on the reference signal, a frequency may increase gradually starting from 0. Through the DFT performed on the modulated signal, a frequency may increase gradually starting from a frequency, for example, f1. The modulated signal may be generated by being delayed by a certain time after the reference signal is generated, and thus the result of the DFT performed on the modulated signal may start from the frequency f1 corresponding to the delayed time.

By dividing, by 2, the difference between the result of the DFT performed on the modulated signal and the result of the DFT performed on the reference signal, a frequency difference between the two DFT results may be obtained. By multiplying the obtained frequency difference by a time T at which the reference signal, or the chirp signal, is generated, and diving a resulting value by a frequency at the time T at which the reference signal is generated, the time difference between the modulated signal and the reference signal may be calculated. The time difference may be equal to a time difference between the reference signal and the input signal.

In one example, in operation 840, the reception time of the signal received from the transmission source is calculated using the time difference re-calculated in operation 850.

According to example embodiments described herein, by downconverting a signal received from a transmission source, which is a target for location measurement, to a baseband signal and cross-correlating a reference signal and a signal obtained by multiplying the downconverted signal by a chirp signal, a time difference between the received signal and the reference signal may be calculated.

In addition, by interpolating a sample only in a period prior to and subsequent to a calculated reception time of an input signal, the time difference between the received signal and the reference signal may be more accurately re-calculated.

The components described in the example embodiments of the present disclosure may be achieved by hardware components including at least one digital signal processor (DSP), a processor, a controller, an application specific integrated circuit (ASIC), a programmable logic element such as a field programmable gate array (FPGA), other electronic devices, and combinations thereof. At least some of the functions or the processes described in the example embodiments of the present disclosure may be achieved by software, and the software may be recorded on a recording medium. The components, the functions, and the processes described in the example embodiments of the present disclosure may be achieved by a combination of hardware and software.

The apparatuses, units, modules, devices, and other components illustrated in FIG. 1 that perform the operations described herein with respect to FIG. 8 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIG. 8. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for calculating a reception time of a wireless communication signal, the apparatus comprising:
    a downconverted signal generator configured to generate a downconverted signal, a baseband signal, by downconverting a frequency of a signal received from a transmission source;
    a modulated signal generator configured to generate a modulated signal by multiplying the downconverted signal by a randomly generated reference signal;
    a time difference calculator configured to calculate a time difference between the modulated signal and the reference signal by cross-correlating the modulated signal and the reference signal; and
    a reception time calculator configured to calculate a reception time of the signal received from the transmission source using a point in time at which the reference signal is generated and the time difference between the modulated signal and the reference signal.

2. The apparatus of claim 1, wherein the downconverted signal generator is configured to determine a modulation index based on a modulation method for the signal received from the transmission source using an auto-correlation function of the signal received from the transmission source.

3. The apparatus of claim 1, wherein the downconverted signal generator is configured to generate the downconverted signal by removing a frequency offset of the received signal estimated through the modulation index based on the modulation method for the received signal.

4. The apparatus of claim 1, wherein the modulated signal generator is configured to generate the modulated signal by multiplying the downconverted signal by the randomly generated reference signal,
    wherein the reference signal is a chirp signal.

5. The apparatus of claim 1, further comprising:
a time difference re-calculator configured to re-calculate the time difference between the modulated signal and the reference signal by increasing a sampling rate by interpolating a sample in a period prior to and subsequent to the calculated reception time, and by performing a discrete Fourier transform (DFT) on the modulated signal and the reference signal.

6. A method of calculating a reception time of a wireless communication signal, the method comprising:
generating a downconverted signal, a baseband signal, by downconverting a frequency of a signal received from a transmission source;
generating a modulated signal by multiplying the downconverted signal by a randomly generated reference signal;
calculating a time difference between the modulated signal and the reference signal by cross-correlating the modulated signal and the reference signal; and
calculating a reception time of the signal received from the transmission source using a point in time at which the reference signal is generated and the time difference between the modulated signal and the reference signal.

7. The method of claim 6, wherein the generating of the downconverted signal comprises:
determining a modulation index based on a modulation method for the signal received from the transmission source using an auto-correlation function of the signal received from the transmission source.

8. The method of claim 6, wherein the generating of the downconverted signal comprises:
generating the downconverted signal by removing a frequency offset of the received signal estimated through a modulation index based on a modulation method for the received signal.

9. The method of claim 6, wherein the generating of the modulated signal comprises:
generating the modulated signal by multiplying the downconverted signal by the reference signal,
wherein the reference signal is a chirp signal.

10. The method of claim 6, further comprising:
re-calculating the time difference between the modulated signal and the reference signal by increasing a sampling rate by interpolating a sample in a period prior to and subsequent to the calculated reception time, and by performing a discrete Fourier transform (DFT) on the modulated signal and the reference signal.

* * * * *